United States Patent [19]

Eisenberger et al.

[11] 3,714,420

[45] Jan. 30, 1973

[54] MAGNETIC DEVICES IRRADIATED BY PENETRATING ELECTROMAGNETIC RADIATION

[75] Inventors: Peter Michael Eisenberger, Morristown; Paul Herman Schmidt, Chatham, both of N.J.

[73] Assignee: Bell Telephone Laboratories, Incorporated, Murray Hill, N.J.

[22] Filed: Dec. 9, 1970

[21] Appl. No.: 96,309

[52] U.S. Cl. ...............250/42, 235/61.12 M, 250/51, 250/106 R, 346/74 MD

[51] Int. Cl. ..........................G01n 23/00, H01j 37/00

[58] Field of Search.235/61.12 M; 250/42, 51, 106 R;

346/74 M, 74 MD

[56] References Cited

UNITED STATES PATENTS 3,005,096 10/1961 Chynoweth ...........................250/42

OTHER PUBLICATIONS

"Application of Orthoferrites to Domain-Wall Devices" by A. H. Bobeck et al., from "IEEE Transactions on Magnetics," Vol. Mag.-5, No. 3, Sept., 1969, pages 544–553.

"Application of Orthoferrites to Domain-Wall Devices" by A. H. Bobeck et al from "IEEE Transactions on Magnetics," Vol. Mag.-5, No. 3, Sept., 1969, pages 544–553.

*Primary Examiner*—William F. Lindquist
*Attorney*—R. J. Guenther and Edwin B. Cave

[57] ABSTRACT

The velocity of propagation at a constant applied field of small enclosed magnetic domains of polarization opposite to that of the immediately surrounding material is increased by irradiating the material with X-rays for a short period of time. By so enhancing the velocity of propagation of these magnetic domains, the functions of switching, memory logic, etc., are thereby performed at a faster rate.

1 Claim, 2 Drawing Figures

PATENTED JAN 30 1973 3,714,420

INVENTORS P. M. EISENBERGER
P. H. SCHMIDT
BY George S. Indig
ATTORNEY

MAGNETIC DEVICES IRRADIATED BY PENETRATING ELECTROMAGNETIC RADIATION

BACKGROUND OF THE INVENTION

1. Field of the Invention

The invention is concerned with magnetic switching and memory devices that depend on the nucleation and propagation of domain walls. Relevant devices are constructed of oxidic magnetic materials best exemplified by the magnetic orthoferrites and magnetic materials of the garnet structure.

2. Description of the Prior Art

Magnetic switching and memory devices have been closely examined in the continuing emphasis on device miniaturization. As a result, many promising configurations have emerged. While some such devices utilize metallic materials, a class of recent interest is dependent on oxidic materials such as orthoferrites, magnetoplumbites, and iron-containing members of the garnet structure. All such devices depend for their operation on nucleation and propagation of domain walls, i.e., the interface between domains of opposite polarity.

An exemplary member of this class of devices, sometimes known as the "bubble" device, depends upon the movement or positioning of small enclosed cylindrically-shaped regions of polarity opposite to that of the surrounding area [see, for example, Vol. MAG-5 IEEE Transactions, pp. 544–553 (1969)].

At this time, magnetic devices of the type described above have been miniaturized to the extent that bit density is limited only by ancillary circuit deposition. Operating bubble devices, for example, have bit densities such as to permit from $10^6$ to $10^7$ positions on a square inch of material.

A material limitation on device operation involving both the write and read modes is concerned with domain wall velocity. It is observed that such velocity for any given field generally does not approach the limiting mobility for such motion in a perfect single crystal. The parameter is postulated to be multiply dependent on a number of practical characteristics such as defects, low angle grain boundaries, and various types of trapping mechanisms, etc. Material modifications (both composition and processing) have resulted in some increase in velocity. Nevertheless, velocity continues to be a practical limitation on device operation.

SUMMARY OF THE INVENTION

In accordance with the invention, it has been discovered that magnetic oxidic materials, including orthoferrites and iron-containing materials of the garnet structure, may be treated by irradiation so as to result in a significant improvement in domain wall velocity. This improvement, which may be as great as five times, is the direct result of simple treatment with electromagnetic radiation over the wavelength range of from 0.2 A to 2.5 A. Commercially available X-ray apparatus is suitable for the purposes of the invention.

DETAILED DESCRIPTION

1. The Figures

Figure 1:
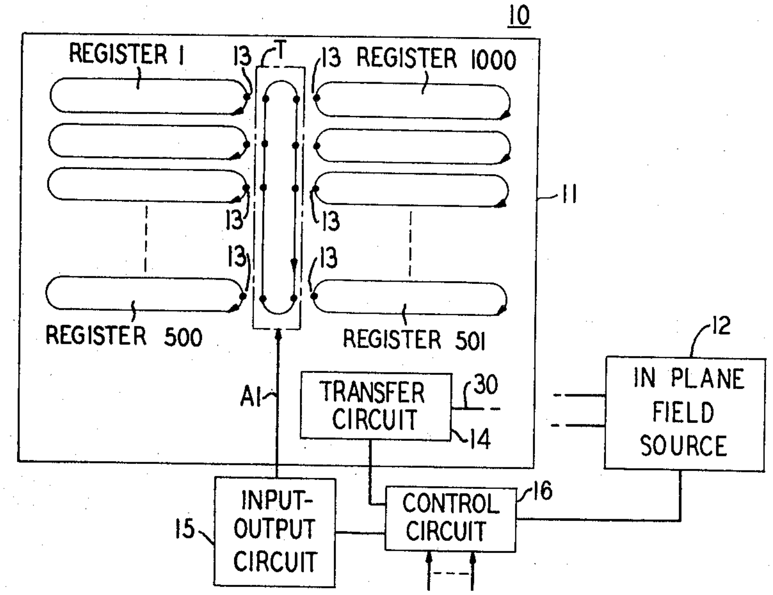
FIGS. 1 and 2 are a schematic representation and plan view, respectively, of a magnetic device utilizing a composition in accordance with the invention.
Figure 2:
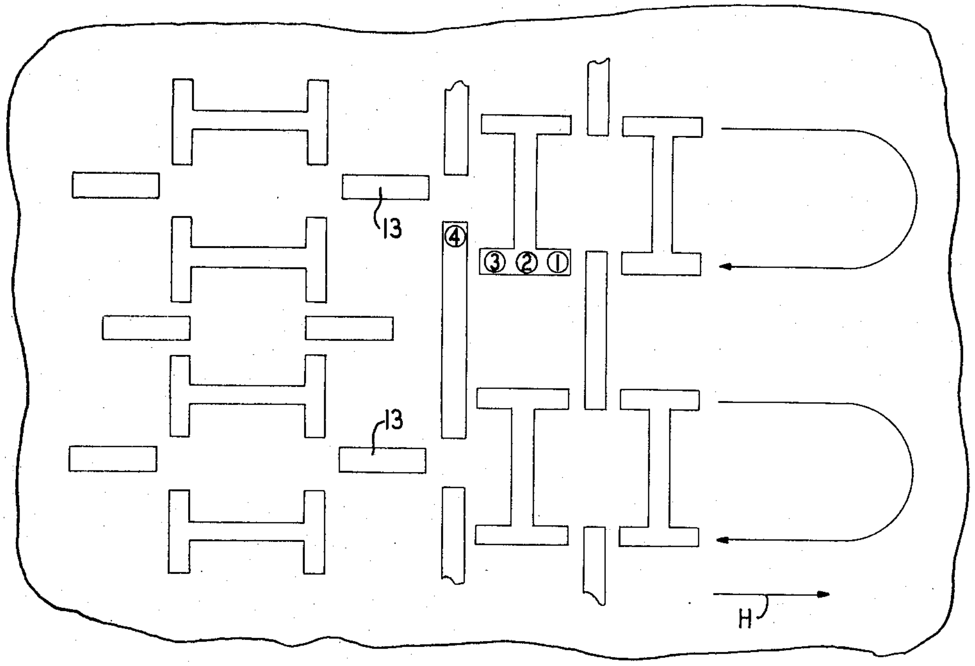

The device of FIGS. 1 and 2 is illustrative of the class of "bubble" devices described by A. H. Bobeck et al. in Vol. MAG-5, IEEE Transactions on Magnetics, pp. 544–553 (1969), in which switching, memory and logic functions depend upon the nucleation and propagation of enclosed, generally cylindrically-shaped, magnetic domains having a polarization opposite to that of the immediately surrounding area. Interest in such devices centers, in large part, on the very high packing density so afforded, and it is expected that commercial devices with from $10^5$ to $10^7$ bit positions per square inch will be commercially available. The device of FIGS. 1 and 2 represents a recent stage of development of the bubble devices and includes some details which have been utilized in operational devices.

FIG. 1 shows an arrangement 10 including a sheet or slice 11 of material in which single wall domains can be moved. The movement of domains is dictated by patterns of magnetically soft overlay material in response to reorienting in-plane fields. For purposes of description, the overlays are bar and T-shaped segments, and the reorienting in-plane field rotates clockwise in the plane of sheet 11 as viewed in FIGS. 1 and 2. The reorienting field source is represented by a block 12 in FIG. 1 and may comprise mutually orthogonal coil pairs (not shown) driven in quadrature as is well understood. The overlay configuration is not shown in detail in FIG. 1. Rather, only closed "information" loops are shown in order to permit a simplified explanation of the basic organization; implementation is described further on.

The figure shows a number of horizontal closed loops separated into right and left banks by a vertical closed loop as viewed. It is helpful to visualize information, i.e., domain patterns, circulating clockwise in each loop as an in-plane field rotates clockwise. This operation is consistent with that described by Bobeck et al. and is explained in more detail hereinafter.

The movement of domain patterns simultaneously in all the registers represented by loops in FIG. 1 is synchronized by the in-plane field. To be specific, attention is directed to a location identified by the numeral 13 for each register in FIG. 1. Each rotation of the in-plane field advances a next consecutive bit (presence or absence of a domain) to that location in each register. Also, the movement of bits in the vertical channel is synchronized with this movement.

In normal operation, the horizontal channels are occupied by domain patterns and the vertical channel is unoccupied. A binary word comprises a domain pattern which occupies simultaneously all the positions 13 in one or both banks, depending on the specific organization, at a given instance. It may be appreciated that a binary word, so represented, is fortunately situated for transfer into the vertical loop.

Transfer of a domain pattern to the vertical loop, of course, is precisely the function carried out initially for either a read or a write operation. The fact that information is always moving in a synchronized fashion permits parallel transfer of a selected word to the vertical channel by the simple expedient of tracking the number of rotations of the in-plane field and accomplishing parallel transfer of the selected word during the proper rotation.

The locus of the transfer function is indicated in FIG. 1 by the broken loop T encompassing the vertical channel. The operation results in the transfer of a domain pattern from (one or) both banks of registers into the vertical channel. A specific example of an information transfer of a one thousand bit word necessitates transfer from both banks. Transfer is under the control of a transfer circuit represented by block 14 in FIG. 1. The transfer circuit may be taken to include a shift register tracking circuit for controlling the transfer of a selected word from memory. The shift register, of course, may be defined in material 11.

Once transferred, information moves in the vertical channel to a read-write position represented by vertical arrow A1 connected to a read-write circuit represented by block 15 in FIG. 1. This movement occurs in response to consecutive rotations of the in-plane field synchronously with the clockwise movement of information in the parallel channels. A read or a write operation is responsive to signals under the control of control circuit 16 of FIG. 1 and is discussed in some detail below.

The termination of either a write or a read operation similarly terminates in the transfer of a pattern of domains to the horizontal channel. Either operation necessitates the recirculation of information in the vertical loop to positions 13 where a transfer operation moves the pattern from the vertical channel back into appropriate horizontal channels as described above. Once again, the information movement is always synchronized by the rotating field so that when transfer is carried out appropriate vacancies are available in the horizontal channels at positions 13 of FIG. 1 to accept information.

For simplicity, the movement of only a single domain, representing a binary one, from a horizontal channel into the vertical channel is illustrated. The operation for all the channels is the same as is the movement of the absence of a domain representing a binary zero. FIG. 2 shows a portion of an overlay pattern defining a representative horizontal channel in which a domain is moved. In particular, the location 13 at which domain transfer occurs is noted.

The overlay pattern can be seen to contain repetitive segments. When the field is aligned with the long dimension of an overlay segment, it induces poles in the end portions of that segment. We will assume that the field is initially in an orientation as indicated by the arrow H in FIG. 2 and that positive poles attract domains. One cycle of the field may be thought of as comprising four phases and can be seen to move a domain consecutively to the positions designated by the encircled numerals 1, 2, 3 and 4 in FIG. 2, those positions being occupied by positive poles consecutively as the rotating field comes into alignment therewith. Of course, domain patterns in the channels correspond to the repeat pattern of the overlay. That is to say, next adjacent bits are spaced one repeat pattern apart. Entire domain patterns representing consecutive binary words, accordingly, move consecutively to positions 13.

The particular starting position of FIG. 2 was chosen to avoid a description of normal domain propagation in response to rotating in-plane fields. That operation is described in detail in the above-mentioned reference publication. Instead, the consecutive positions from the right, as viewed in FIG. 1, for a domain adjacent the vertical channel preparatory to a transfer operation are described. A domain in position 4 of FIG. 2 is ready to begin its transfer cycle.

2. Processing Conditions

The mechanism responsible for improving the velocity of propagation of domain walls has not been positively established. Operating parameters set forth in this section are dependent upon actual experimental results. However, experiments have been conducted on a sufficient number of compositions to establish applicability of the inventive process to the class of materials of concern, i.e., iron-containing magnetic materials which are either orthoferrites or of the garnet structure. All such materials are primarily oxidic (at least 99 ion percent of all anions). The magnetic properties of all such materials are largely dependent on iron inclusion although the iron contribution is frequently altered by substitution of other cations in iron sites. The magnetic properties may also depend on the presence of one or more rare earth ions of the lanthanide series. This entire class of materials is found to exhibit approximately the same improvement when irradiated at the same levels.

a. Wavelength of Irradiation

It appears that from the standpoint of the device parameter of interest (domain wall velocity), there is no particular preference for any specific wavelength within the permitted range of from 0.2 A to 2.5 A. Selection of a value is determined largely on the basis of specimen thickness. Here, there are two conflicting considerations: The material is more transparent to shorter wavelengths, and hence more uniformly irradiated; however, at sufficiently short wavelengths, the material becomes too transparent and there is no improvement in the velocity. On the other hand, longer wavelengths require less expenditure of energy; however, at sufficiently long wavelengths, the material becomes too opaque and the radiation is absorbed in the surface layer only, again resulting in little or no improvement in the velocity. Thus, a compromise between complete transparency and complete absorption must be found; this compromise has been found to be maximized at a level of radiation absorption between 70 and 90 percent of the incident energy.

Parameters are set in terms of usual device design which assumes a magnetic material thickness of the order of from fractions of a mil to tenths of an inch. Under these circumstances, it is generally possible to select radiation wavelength values that permit both reasonable uniformity of improvement through the sample thickness and also reasonably expedient exposure times. For these purposes, it has been found that a reasonable uniformity range corresponds with conditions under which from 70 to 90 percent of the irradiating energy is absorbed through the sample thickness, as described above. Other considerations have to do with the radiation dosage to which the material is exposed. Too low a value yields a degree of improvement considered inadequate for the inventive purposes. Too high a dosage results in crystalline damage which initially tends to limit the velocity improvement realized and which ultimately results in reduction of the velocity.

It has been established on the above basis that a dosage in the range of from $10^{-3}$ to $10^{-5}$ photons per atom of irradiated material is appropriate for the practice of the invention. For thicknesses of the order of concern, such dosage may be achieved by exposure of a few minutes or less using commercially available X-ray equipment.

Dosages (D) within the range prescribed are related to the following parameters: time ($t$) in seconds of irradiation, incident radiation flux (I) in photons per square centimeter per second, number of atoms per cubic centimeter (N), and sample thickness ($d$) in the irradiation direction in centimeters.

$$D=(tI/Nd) \qquad (1)$$

Note: Discussion in terms of X-ray irradiation relates to the most usual commercial means of practicing the invention. The appropriate radiation is, however, completely characterized in terms of wavelength and dosage. Other suitable sources are known. These include, for example, γ-ray sources, such as the radioactive isotopes ${}_{27}Co^{57}$ and ${}_{50}Sn^{119m}$.

b. Intensity of Irradiation

The range of the intensity of the incident radiation (the radiation flux density) is constrained by practical considerations. Too low an intensity will require too long a time for exposure of the material to be useful for commercial applications and too high an intensity will result in crystalline damage, regardless of the dosage level. Within a time period of from 1 to $10^5$ seconds of exposure of the material to irradiation, the constraint imposed by equation (1) allows a range of intensity of incident radiation of from $10^{11}$ to $10^{16}$ photons per square centimeter per second. Exemplary conditions have employed an intensity of incident radiation of $10^{14}$ photons per square centimeter per second and an exposure time of the material to the irradiation of from 60 to 120 seconds.

c. Effects of Irradiation

Having selected the wavelength in accordance with the considerations set forth above, the appended table summarizes the results obtained by irradiating selected orthoferrites and garnets. The table lists the materials, the radiation wavelength to which they have been exposed, the length of time of the exposure, the radiation dosage, and the ratio of velocity of propagation of domain walls after X-ray irradiation to that before the irradiation. For the sake of comparison, the samples were all exposed to the same radiation flux density of $10^{14}$ photons per square centimeter per second.

TABLE I

Experimental Results on the Effect of X-Ray Irradiation on the Velocity of Propagation of Domain Walls

| Material | Radiation wave length, A | Radiation Time, Min. | Radiation dosage, Photons per atom | Ratio of Velocity after irradiation to Before |
|---|---|---|---|---|
| $Sm_{.55}Tb_{.45}FeO_3$ | 0.21 | 1 | $1\times10^{-5}$ | 5 |
| $Sm_{.55}Tb_{.45}FeO_3$ | 0.71 | 1 | $1\times10^{-5}$ | 1.2 |
| $YFeO_3$ | 0.71 | 2 | $2\times10^{-5}$ | 2 |
| $Eu_2Er_1Ga_{.7}Fe_{4.3}O_{12}$ | 0.71 | 1 | $4\times10^{-5}$ | 2.7 |
| $(Gd_{.78}Tb_{.22})_3Fe_5O_{12}$ | 0.71 | 1 | $4\times10^{-5}$ | 2.7 |

It is apparent from Table I that the treatment of these magnetic materials by X-ray irradiation results in an improvement in the velocity of domain wall movement through the material, measured at a constant field. More judicious selection of some of the parameters within the constraints imposed above should further improve the velocity of the domain walls.

What is claimed is:

1. A device, the operation of which is based on the propagation of magnetic domains through regions of opposite magnetization, comprising a material selected from the group consisting of iron-containing magnetic orthoferrites and iron-containing magnetic garnets, characterized in that said material is exposed for a time of from 1 to $10^5$ seconds to electromagnetic radiation having a wavelength of from 0.2 to 2.5 A, said radiation having a flux density of from $10^{11}$ to $10^{16}$ photons per square centimeter per second, with said time and said flux density selected so as to yield a value for the ratio of the amount of radiation absorbed to the number of atoms irradiated in said material of from $10^{-5}$ to $10^{-3}$ photons per atom for the particular thickness of said material, thereby increasing the velocity of propagation of said magnetic domains.

* * * * *